(12) United States Patent
Kalliokulju et al.

(10) Patent No.: US 7,009,951 B2
(45) Date of Patent: *Mar. 7, 2006

(54) DATA PACKET NUMBERING IN MOBILE PACKET SWITCHED DATA TRANSMISSION

(75) Inventors: Juha Kalliokulju, Vesilahti (FI); Sinikka Sarkkinen, Kangasala (FI); Jan Suumäki, Tampere (FI); Ari Tourunen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 694 days.

This patent is subject to a terminal disclaimer.

(21) Appl. No.: 09/779,979

(22) Filed: Feb. 9, 2001

(65) Prior Publication Data

US 2001/0017850 A1    Aug. 30, 2001

(30) Foreign Application Priority Data

Feb. 14, 2000 (FI) .................................. 20000314
Aug. 14, 2000 (FI) .................................. 20001792

(51) Int. Cl.
*H04L 12/56* (2006.01)

(52) U.S. Cl. ...................................... 370/331; 370/394

(58) Field of Classification Search ............... 370/331, 370/332, 349, 390, 355, 389, 392, 393, 394, 370/396, 338, 428; 455/436, 438, 439, 432.2, 455/442, 445, 455; 714/18, 748, 749, 750
See application file for complete search history.

(56) References Cited

U.S. PATENT DOCUMENTS

| | | | | |
|---|---|---|---|---|
| 5,206,863 A | * | 4/1993 | Nazarenko et al. | 714/752 |
| 5,245,616 A | * | 9/1993 | Olson | 714/748 |
| 5,319,712 A | * | 6/1994 | Finkelstein et al. | 380/44 |
| 5,371,734 A | * | 12/1994 | Fischer | 370/311 |

(Continued)

FOREIGN PATENT DOCUMENTS

JP    05-153162    6/1993

OTHER PUBLICATIONS

"The GSM System for Mobile Communications", Mouly et al., France, 1992.

(Continued)

*Primary Examiner*—Chau Nguyen
*Assistant Examiner*—Ian N. Moore
(74) *Attorney, Agent, or Firm*—Perman & Green, LLP (57) ABSTRACT

A method of numbering data packets in a packet-switched telecommunications system which utilizes acknowledged transmission and the telecommunications protocol of which comprises a convergence protocol layer for converting user data packets into convergence protocol packets, and a link layer for transmitting convergence protocol packets as data units and for acknowledging the transmission. A data packet number is defined for the convergence protocol packets to be sent by a counter and the convergence protocol packets to be sent are transmitted to the link layer for transmission without the data packet number. A data packet number is also defined for received convergence protocol packets by means of the counter and an acknowledgement of received convergence protocol packets is transmitted to the transmitter.

31 Claims, 6 Drawing Sheets

U.S. PATENT DOCUMENTS

| | | | |
|---|---|---|---|
| 5,570,367 A | * | 10/1996 | Ayanoglu et al. ............ 370/346 |
| 5,875,292 A | * | 2/1999 | Taketsugu .................... 714/18 |
| 5,987,137 A | | 11/1999 | Karppanen et al. ............ 380/28 |
| 6,011,796 A | * | 1/2000 | Rezaiifar et al. ............ 370/394 |
| 6,038,606 A | * | 3/2000 | Brooks et al. .............. 709/235 |
| 6,374,112 B1 | * | 4/2002 | Widegren et al. ........ 455/452.2 |
| 6,405,337 B1 | * | 6/2002 | Grohn et al. ................ 714/749 |
| 6,466,556 B1 | * | 10/2002 | Boudreaux .................. 370/331 |
| 6,473,399 B1 | * | 10/2002 | Johansson et al. .......... 370/229 |
| 6,480,476 B1 | * | 11/2002 | Willars ....................... 370/311 |
| 6,529,525 B1 | * | 3/2003 | Pecen et al. ................ 370/469 |
| 6,532,211 B1 | * | 3/2003 | Rathonyi et al. ........... 370/230 |
| 6,643,318 B1 | * | 11/2003 | Parsa et al. ................. 375/141 |
| 2003/0067920 A1 | * | 4/2003 | Rezaiifar et al. ........... 370/394 |

OTHER PUBLICATIONS

"3$^{rd}$ Generation Partnership Project; Technical Specification Group Radio Access Network; Packet Data Convergence Protocol (PDCP) Specification (3G TS 25.323 V3.0.0)", 1999, relevant pp. 1-16.

3$^{rd}$ Generation Partnership Project; Technical Specification Group Services and System Aspects; General Packet Radio Service (GPRS); Service Description; Stage 2 (3G TS 23.060 version 3.2.1), 2000, relevant p. 119.

* cited by examiner

| Data |
|---|
| Data |

FIG. 9a

| PDU type | PID |
|---|---|
| Data | |
| Data | |

FIG. 9b

| PDU type | PID |
|---|---|
| Seq. number | |
| Seq. number | |
| Data | |
| Data | |

FIG. 9c

DATA PACKET NUMBERING IN MOBILE PACKET SWITCHED DATA TRANSMISSION

BACKGROUND OF THE INVENTION

The invention relates to packet-switched data transmission, and more precisely, to optimization of data packet numbering, particularly in connection with acknowledged data transmission.

One of the aims in the development of third-generation mobile communication systems, which are called e.g. the UMTS (Universal Mobile Communication System) and the IMT-2000 (International Mobile Telephone System), has been as good compatibility as possible with the second-generation mobile communication systems, such as the GSM system (Global System for Mobile Communications). For example, the core network of the UMTS system is designed to be built on the basis of the GSM core network, which allows as efficient utilization of the existing networks as possible. A further object is to enable third-generation mobile stations to perform handover between the UMTS and the GSM systems. This also applies to packet-switched data transmission, particularly between the UMTS and the packet radio network GPRS (General Packet Radio Service) designed for the GSM system.

In packet-switched data transmission we can employ reliable, i.e. acknowledged, transmission or unreliable, i.e. unacknowledged, transmission. In acknowledged data transmission the receiver sends an acknowledgement of received data packets PDU (Protocol Data Unit) to the transmitter, and thus the transmitter can retransmit lost or damaged packets. When inter-SGSN (Serving GPRS Support Node) handover is performed in the GPRS system, reliability of data transmission is ensured by means of an 8-bit N-PDU number (Network PDU) which is attached to data packets and used for checking which data packets were transmitted to the receiver. In the UMTS system according to the current specifications, a 12-bit RLC sequence number of the RLC layer (Radio Link Control) of the packet data protocol is used for guaranteeing reliability of handover between serving support nodes in packet-switched data transmission.

In handover from the GPRS to the UMTS, the UMTS system is responsible for reliability of handover. The reliability is checked by means of N-PDU numbers of the GPRS, which are used for generating identification numbers to be used in the handover process in the UMTS. When handover is performed from the UMTS to the GPRS, the GPRS system is responsible for the handover, in which case reliability is checked on the basis of the identification data of data packets included in the UMTS. For this purpose, an 8-bit data packet number has been designed for the UMTS system, which is added as an additional byte to a data packet of a convergence protocol layer PDCP (Packet Data Convergence Protocol) belonging to the UMTS data packet protocol. This PDCP-PDU number thus forms a data packet number which logically corresponds to the N-PDU number of the GPRS and on the basis of which it is checked during handover whether all data packets have been transmitted reliably. It is also possible to form the 8-bit PDCP-PDU number from 12-bit RLC sequence numbers by removing the four most significant bits. Corresponding PDCP-PDU, i.e. N-PNU, numbering can also be used in internal handover between radio network subsystems in the UMTS (SRNS Relocation). Data packets PDU are inserted into a buffer to wait until handover has been performed to a serving support node SGSN of another system or to a new serving radio network subsystem SRSN in the internal handover in the UMTS, and the transmitted data packets can be removed from the buffer as an acknowledgement of received data packets is received from the receiver.

A problem related to the arrangement described above is attachment of the additional byte formed by the PDCP-PDU number to the header field of each data packet in the convergence protocol layer PDCP. This increases the load in data transmission because an additional byte is transmitted in each data packet. In normal data transmission, the UMTS packet data service has no use for the PDCP-PDU number; it is only utilized in handover between the UMTS and the GPRS and in internal handover in the UMTS.

A further problem related to the arrangement described above is generation of PDCP-PDU numbers from RLC sequence numbers. The RLC sequence numbers are defined consecutively for the data units RLC-PDU of the RLC layer. Due to delay in the system the buffer may contain a large number of data units RLC-PDU. If the RLC sequence numbers exceed 255, which is the largest decimal number that can be represented by eight bits, two or more data packets may receive the same PDCP-PDU number because the four most significant bits are removed from the twelve bits of the RLC sequence numbers. In that case the receiver cannot unambiguously define the data packet to be acknowledged on the basis of the PDCP-PDU number of the received packet, and reliability of handover can no longer be guaranteed.

Possible multiplexing of packet data transmissions in the PDCP layer may also constitute a problem because the RLC layer below the PDCP layer receives data packets simultaneously from several connections. Since the reliability of handover is ascertained on the basis of connection, it is very difficult to define RLC sequence numbers for several simultaneous connections as well as unreliable in view of handover.

BRIEF DESCRIPTION OF THE INVENTION

An object of the invention is to provide an improved method and an apparatus implementing the method to minimize the above-mentioned disadvantages. The objects of the invention are achieved with a method and an arrangement which are characterized by what is disclosed in the independent claims. The preferred embodiments of the invention are disclosed in the dependent claims.

The invention is based on using 'virtual' data packet numbering maintained by counters in data packet numbering in the PDCP layer. Both the transmitting PDCP and the receiving PDCP monitor the data packets to be transmitted by means of counters, and the receiving PDCP acknowledges received data packets by means of the counter reading, preferably in a manner corresponding to normal acknowledged data transmission, in which case data packet numbers need not be transmitted with the data packets. According to a preferred embodiment of the invention, a data packet number can be attached to data packets transmitted in poor transmission conditions or due to limitations of the system at certain intervals. The data packet number is not added to each data packet, yet the data packet counters can be synchronized.

An advantage of the method and arrangement of the invention is that in optimal transmission situations acknowledged data transmission can be guaranteed without having to transmit any data packet number. In non-optimal transmission conditions data packet numbers are transmitted in very few data packets. Another advantage is that the data packets to be acknowledged and removed from the buffer can be determined unambiguously. A further advantage is that the method according to the invention is not applicable only to internal handover between radio network subsystems of the UMTS, but also to handover between the UMTS and the GPRS, provided that corresponding virtual data packet numbering will also be introduced into future GPRS versions.

BRIEF DESCRIPTION OF THE DRAWINGS

The invention will be described in greater detail by means of preferred embodiments with reference to the accompanying drawings, in which.

DETAILED DESCRIPTION OF THE INVENTION

In the following, the invention will be explained using as an example a packet radio service of the UMTS and GPRS systems. However, the invention is not limited to these systems, but may be applied to any packet-switched data transmission method which requires acknowledgement of data packets in the manner to be described below. The invention is particularly suitable both for acknowledged handover between the UMTS and the GPRS and for internal handover between radio network subsystems in the UMTS (SRNS Relocation). Thus in the former case the term receiving PDCP used in this description can be replaced with the corresponding function of the GPRS, i.e. SNDCP.

Figure 1:
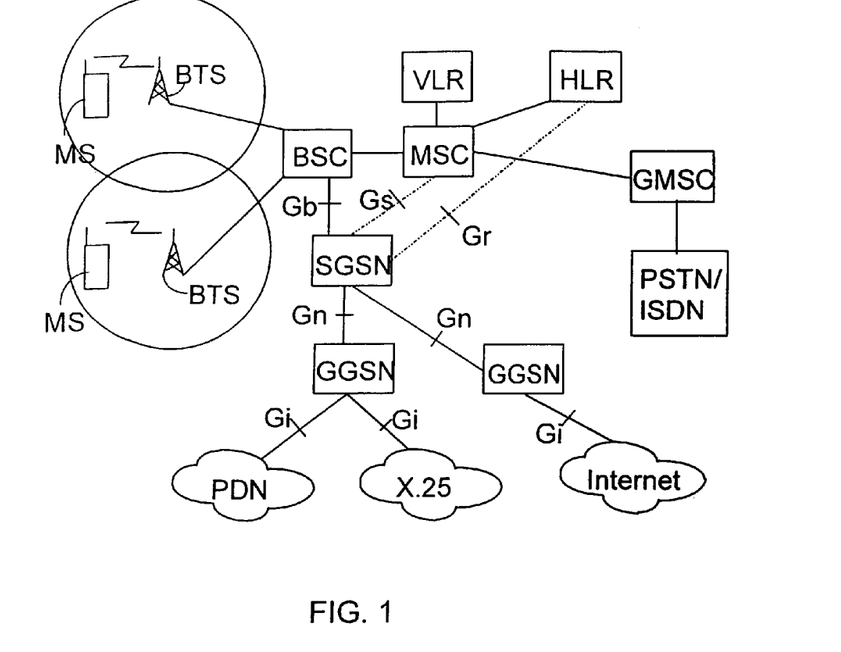
FIG. 1 is a block diagram of the structure of the GSM/GPRS system.

FIG. 1 illustrates how the GPRS system is built on the basis of the GSM system. The GSM system comprises mobile stations MS, which communicate with base transceiver stations BTS via radio paths. Several base transceiver stations BTS are connected to a base station controller BSC, which controls the radio frequencies and channels available to the base transceiver stations. The base station controllers BSC communicate, via an A interface, with a mobile services switching centre MSC, which is responsible for connection set-up/establishment and routing of calls to correct addresses. The MSC is assisted by two data bases which comprise information on mobile subscribers: a home location register HLR which contains information on all subscribers of the mobile communication network and on the services ordered by them, and a visitor location register VLR which contains information on mobile stations which visit the are of a certain mobile services switching centre MSC.

The mobile services switching centre MSC communicates with other mobile services switching centres via a gateway mobile services switching centre GMSC and with a public switched telephone network PSTN. As regards a more detailed description of the GSM system, reference is made to ETSI/GSM specifications and to *The GSM system for Mobile Communications*, M. Mouly and M. Pautet, Palaiseau, France, 1992, ISBN: 2-957190-07-7.

A GPRS system connected to the GSM network comprises two nearly independent functions, i.e. a gateway GPRS support node GGSN and a serving GPRS support node SGSN. The GPRS network may comprise several serving support nodes and gateway support nodes, and typically several serving support nodes SGSN are connected to one gateway support node GGSN. Both the SGSN node and the GGSN node function as routers which support mobility of the mobile station and control the mobile communication system and route data packets to mobile stations regardless of their location and the protocol used. The serving support node SGSN communicates with a mobile station MS via the mobile communication network. The connection to the mobile communication network (Gb interface) is typically established either via the base transceiver station BTS or the base station controller BSC. The function of the serving support node SGSN is to detect mobile stations capable of packet radio connections in its area, send data packets to and receive them from these mobile stations and to monitor the location of the mobile stations in its service area. In addition, the serving support node SGSN communicates with the mobile services switching centre MSC and the visitor location register VLR via a signalling interface Gs and with the home location register HLR via a Gr interface. The home location register HLR also contains GPRS records which are related to the packet radio service and include the contents of subscriber-specific packet data protocols.

The gateway support node GGSN functions as a gateway between the GPRS network and an external data network PDN (Packet Data Network). External data networks include a GPRS network of another network operator, the Internet, an X.25 network or a private local area network. The gateway support node GGSN communicates with these data networks via a Gi interface. The data packets to be transmitted between the gateway support node GGSN and the serving support node SGSN are always encapsulated according to the GPRS standard. The gateway support node GGSN also contains the PDP addresses (Packet Data Protocol) of GPRS mobile stations and the routing data, i.e. SGSN addresses. The routing data are thus used for linking data packets between the external data network and the serving support node SGSN. The GPRS core network between the gateway support node GGSN and the serving support node SGSN is a network which utilizes the IP protocol, preferably IPv6 (Internet Protocol, version 6).

In packet-switched data transmission the connection offered by the telecommunications network between a terminal and a network address is commonly called a context. This refers to a logical link between destination addresses via which data packets are transmitted between the destination addresses. This logical link may also exist even though no packets are transmitted, in which case it does not use the system capacity, which can be reserved for other connections. Thus the context differs from a circuit-switched connection, for example.

Figure 2:
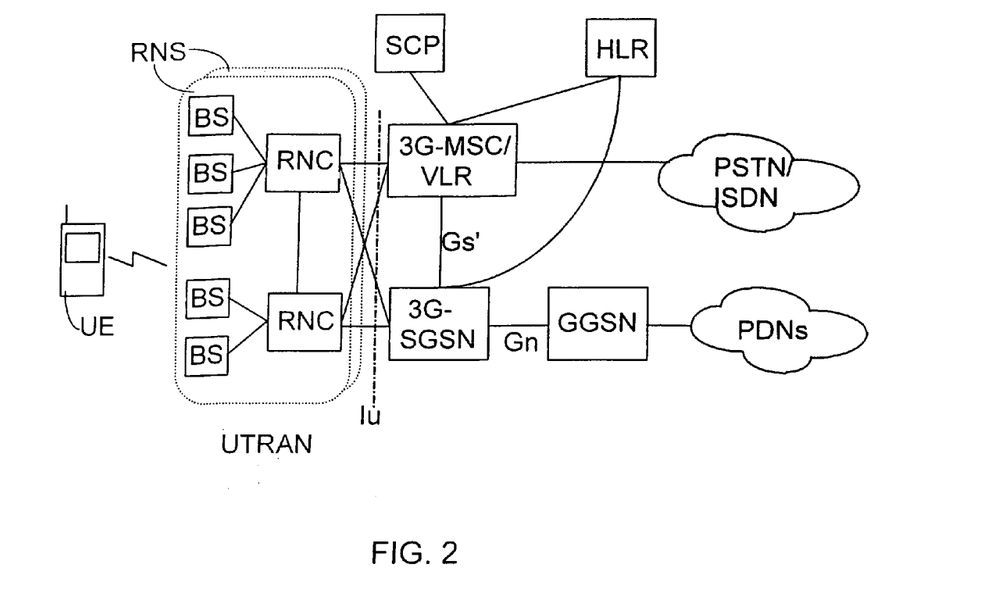
FIG. 2 is a block diagram of the structure of the UMTS system.

FIG. 2 shows in a simplified manner how the third-generation UMTS network can be built in connection with an advanced GSM core network. In the core network the mobile services switching centre/visitor location register 3G-MSC/VLR communicates with the home location register HLR and preferably also with the service control point SCP of an intelligent network. The connection to the serving support node 3G-SGSN is established via a Gs' interface and to the public switched telephone network PSTN/ISDN as described above in connection with the GSM. From the serving support node 3G-SGSN a connection is established to external data networks PDN exactly in the same way as in the GPRS system, i.e. via the Gn interface to the gateway support node 3G-GGSN, which is connected to external data networks PDN. Both the mobile services switching centre 3G-MSC/VLR and the serving support node 3G-SGSN communicate with a radio network UTRAN (UMTS Terrestrial Radio Access Network) via a Iu interface, which in view of the GSM/GPRS system combines functionalities of the A and Gb interfaces. The Iu interface can also be provided with totally new functionalities. The radio network UTRAN comprises several radio network subsystems RNS which consist of radio network controllers RNC and base stations BS, which communicate with the radio network controllers and are also called node Bs. The base stations communicate with user equipment UE, typically with mobile stations MS, via radio paths.

Figure 3A:
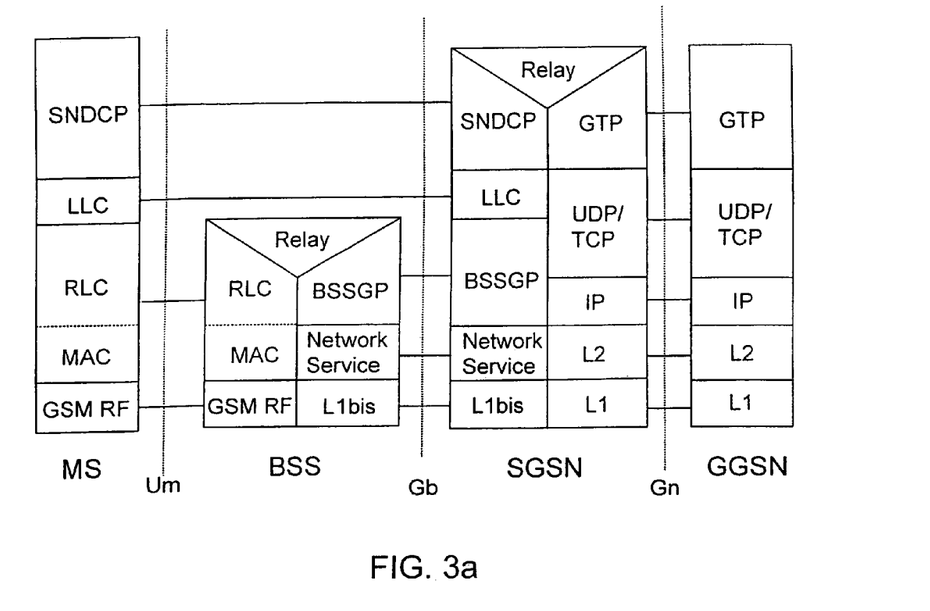
FIGS. 3a and 3b illustrate protocol stacks of user data connections in the GPRS and UMTS.
Figure 3B:
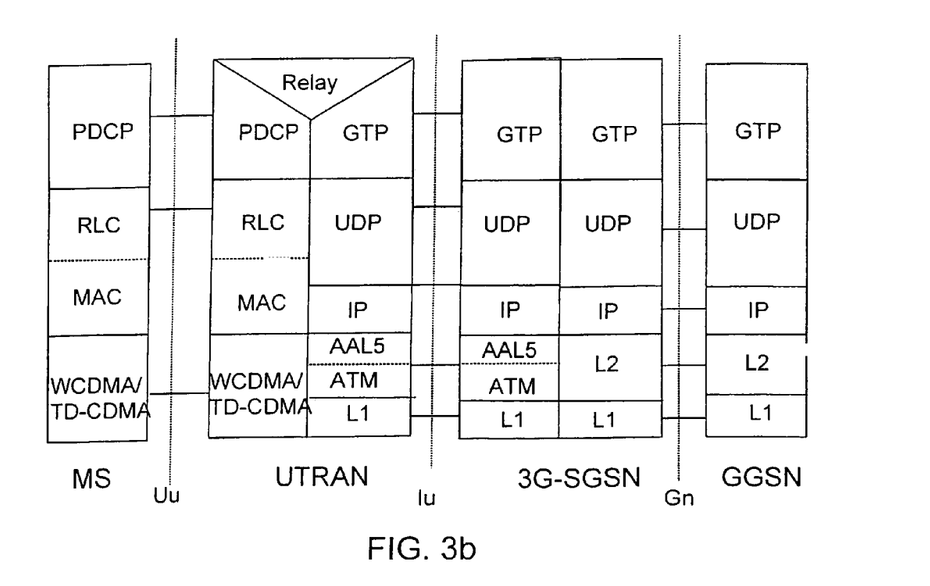

FIGS. 3a and 3b illustrate protocol stacks of the GPRS and the UMTS, respectively. Definitions in accordance with these protocols are used in the transmission of user data in the systems concerned. FIG. 3a shows a protocol stack used for transmitting user data between the mobile station MS and the gateway support node GGSN in the GPRS system. Between the mobile station MS and the base station system BSS of the GSM network data are transmitted over the Um interface according to the normal GSM protocol. At the Gb interface between the base station system BSS and the serving support node SGSN the lowest protocol layer has been left open, and an ATM protocol or a Frame Relay protocol is used in the second layer. A BSSGP layer (Base Station System GPRS Protocol) above the second layer adds definitions of routing and quality service and signallings related to acknowledgement of data packets and management of the Gb interface to the data packets to be transmitted.

Direct communication between the mobile station MS and the serving support node SGSN is defined in two protocol layers, i.e. in SNDCP (Sub-Network Dependent Convergence Protocol) and LLC (Logical Link Layer). The user data to be transmitted is segmented into one or more SNDC data units in the SNDCP layer, in which case the TCP/IP or UDP/IP header field related to it can be compressed, if desired. The SNDC data units are transmitted in LLC frames to which address and control information relevant to data transmission has been added and in which the SNDC data units can be encrypted. The function of the LLC layer is to maintain a data transmission connection between the mobile station MS and the serving support node SGSN and retransmit damaged frames. The serving support node SGSN is responsible for routing data packets arriving from the mobile station MS further to the correct gateway support node GGSN. A tunnelling protocol (GTP, GPRS Tunnelling Protocol) is used on this connection for encapsulating and tunnelling all the user data and signalling transmitted via the GPRS core network. The GTP protocol is run above the IP utilized by the GPRS core network.

The protocol stack according to FIG. 3b used in transmission of packet-switched user data in the UMTS corresponds to a great extent to the GPRS protocol stack, but there are some significant exceptions. As is seen in FIG. 3b, in the UMTS the serving support node 3G-SGSN does not communicate directly with the user equipment UE, such as a mobile station MS, in any protocol layer, but all the data are transmitted via the radio network UTRAN. In that case the serving support node 3G-SGSN mainly functions as a router which transmits data packets in accordance with the GTP protocol to the radio network UTRAN. At the Uu interface between the radio network UTRAN and the user equipment UE lower-level data transmission occurs according to the WCDMA or the TD-CDMA protocol in the physical layer. In respect of their functions the RLC and MAC layers on top of the physical layer resemble the corresponding layers of the GSM; however, some functions of the LLC layer have been transferred to the RLC layer of the UMTS. A PDCP layer on top of these mainly replaces the SNDPC layer of the GPRS system, and the functionalities of the PDCP layer are nearly similar to those of the SNDP layer.

Figure 4:
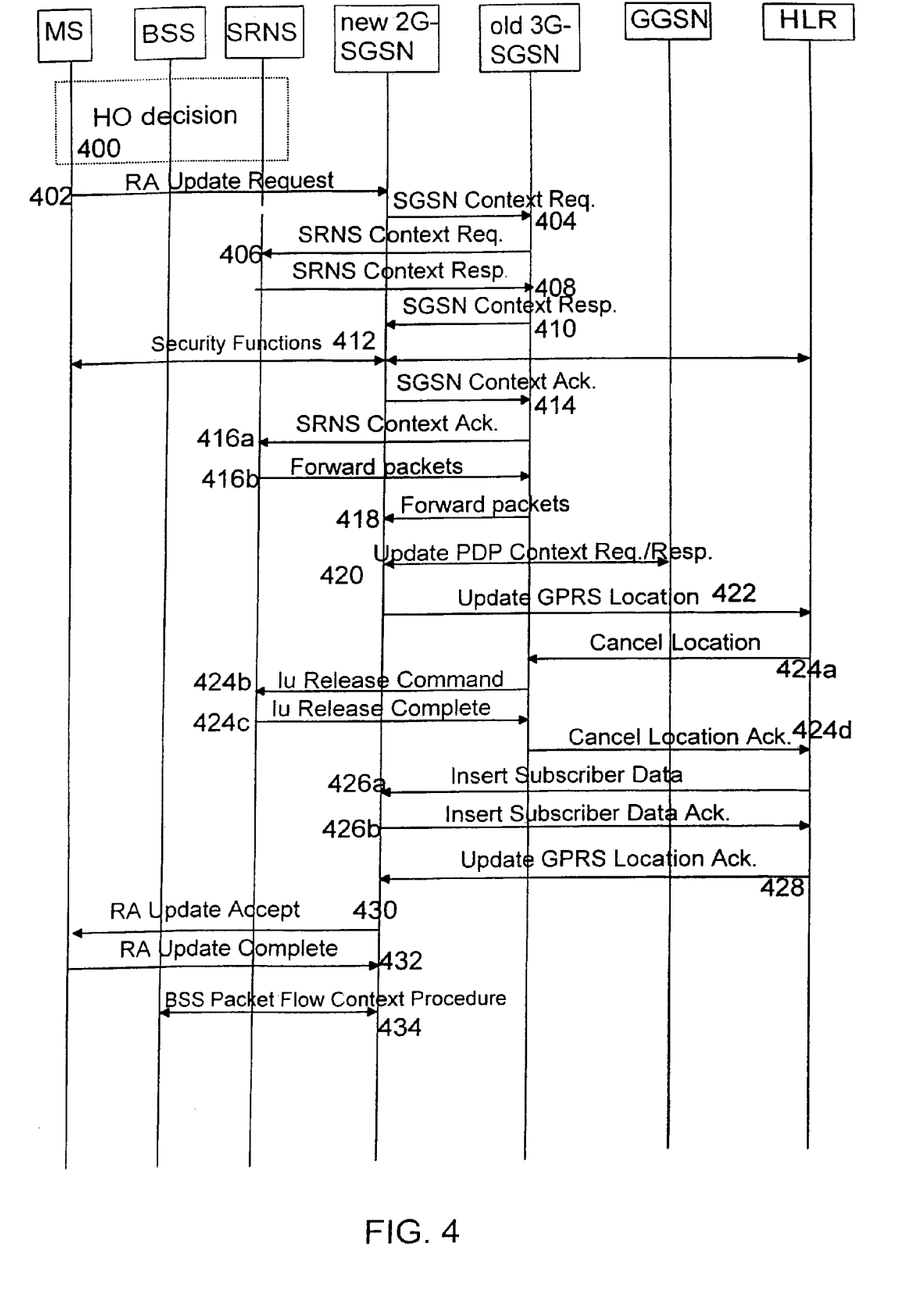
FIG. 4 is a signalling chart illustrating a prior art handover process from the UMTS to the GPRS system.

The signalling chart in FIG. 4 illustrates a prior art handover from the UMTS to the GPRS. Handover of this kind is performed when the mobile station MS moves during packet data transmission from a UMTS cell to a GSM/GPRS cell which uses a different serving support node SGSN. In that case the mobile stations MS and/or radio networks BSS/UTRAN make a decision on handover (step 400). The mobile station sends a routing area update request (RA Update Request, 402) to a new serving support node 2G-SGSN. The serving support node 2G-SGSN sends an SGSN context request (404), which defines mobility management of the mobile station and the PDP context, to the old serving support node 3G-SGSN. The serving support node 3G-SGSN sends an SRNS context request (406) to the radio network subsystem SRNS (serving RNS) that has been responsible for the packet data connection, or more precisely, to radio network controllers SRNC (serving RNC) of the system. In response to the request the SRNS stops sending data packets to the mobile station MS, inserts the data packets to be transmitted into a buffer and sends a response (SRNS Context Response, 408) to the serving support node 3G-SGSN. In this connection the radio network subsystem SRNS, for example, defines PDCP-PDU numbers, i.e. N-PDU numbers, for the data packets to be inserted into the buffer. Having received mobility management data of the mobile station MS and PDP context data, the serving support node 3G-SGSN passes them to the serving support node 2G-SGSN (SGSN Context Response, 410).

If necessary, the serving support node 2G-SGSN can authenticate the mobile station from the home location register HLR (Security Functions, 412). The new serving support node 2G-SGSN informs the old serving support node 3G-SGSN that it is ready to receive data packets of activated PDP contexts (SGSN Context Ack, 414). In response to this the serving support node 3G-SGSN requests the radio network subsystem SRNS (SRNS Context Ack, 416a) to forward the data packets inserted into its buffer to the serving support node 3G-SGSN (Forward Packets, 416b), which forwards them to the serving support node 2G-SGSN (Forward Packets, 418). The serving support node 2G-SGSN updates a PDP context with the gateway support node GGSN in accordance with the GPRS system (Update PDP Context Request/Response, 420). After this, the serving support node 2G-SGSN informs the home location register HLR of the new serving support node (Update GPRS Location, 422), in which case the connection established by the old serving support node 3G-SGSN and the radio network subsystem SRNS is disconnected (424a, 424b, 424c, 424d), the necessary subscriber data are transmitted to the new serving support node 2G-SGSN (426a, 426b), and the home location register HLR acknowledges the new serving support node 2G-SGSN (Update GPRS Location Ack, 428).

Then the serving support node 2G-SGSN checks the subscriber rights of the mobile station MS and its location and establishes a logical link between the serving support node 2G-SGSN and the mobile station MS, after which the routing area update request made be the mobile station MS can be accepted (RA Update Accept, 430). In this connection the mobile station MS is also informed of which data packets sent by the mobile station MS to the radio network subsystem SRNS of the UMTS before the handover process started have been received successfully. These data packets are identified with PDCP-PDU numbers generated as described above. The mobile station MS acknowledges acceptance of the routing area update request (RA Update Complete, 432), and at the same time the serving support node 2G-SGSN is informed of which data packets transmitted by the serving support node 3G-SGSN via the radio network subsystem SRNS before the handover process started have been received successfully by the mobile station MS. After this, the new serving support node 2G-SGSN can initiate transmission of data packets via the base station system BSS (434).

The following table illustrates generation of 8-bit PDCP-PDU numbers from RLC sequence numbers and problems caused by this.

| Bit no. | 12 | 11 | 10 | 9 | 8 | 7 | 6 | 5 | 4 | 3 | 2 | 1 |
|---|---|---|---|---|---|---|---|---|---|---|---|---|
| 94 | | 0 | 0 | 0 | 0 | 0 | 1 | 0 | 1 | 1 | 1 | 1 | 0 |
| 350 | | 0 | 0 | 0 | 1 | 0 | 1 | 0 | 1 | 1 | 1 | 1 | 0 |
| 606 | | 0 | 0 | 1 | 0 | 0 | 1 | 0 | 1 | 1 | 1 | 1 | 0 |
| 862 | | 0 | 0 | 1 | 1 | 0 | 1 | 0 | 1 | 1 | 1 | 1 | 0 |

It can be seen in the table, for example, how 12-bit decimal numbers 94, 350, 606 and 862 are converted into 8-bit numbers by the method described above. Since only the eight least significant bits are taken into account in the conversion, all the above-mentioned numbers receive the same 8-bit binary representation. If the buffer thus contains nearly 900 data units RLC-PDU, the data units containing the above-mentioned RLC sequence numbers receive the same 8-bit representation. When the receiver acknowledges successfully received data packets to the transmitter, the transmitter cannot know unambiguously in the basis of acknowledged 8-bit numbers which data packet can be removed from the buffer.

Figure 5:
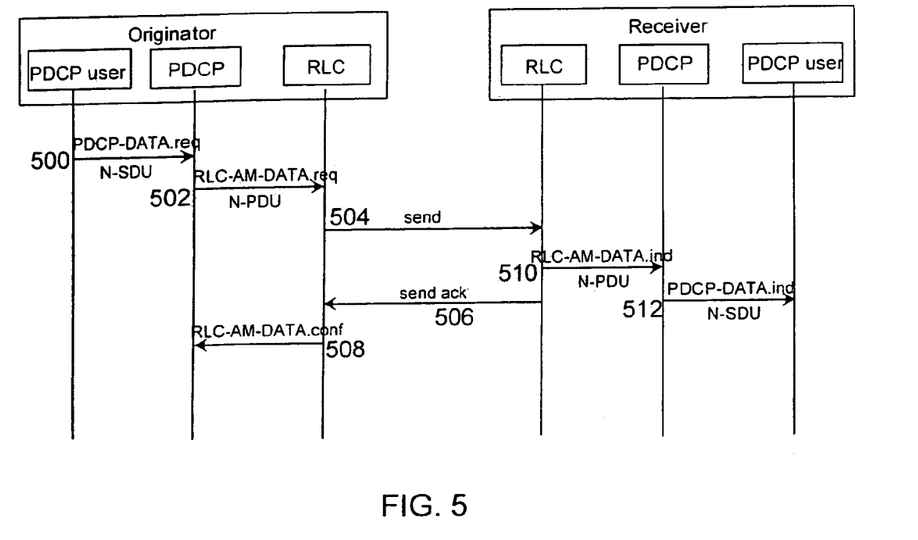
FIG. 5 is a signalling chart illustrating acknowledged data transmission and acknowledgement of data packets in PDCP data transmission.

FIG. 5 shows how data transmission is acknowledged and how data packets travel when acknowledged transmission is used in PDCP data transmission. A PDCP entity receives a request (PDCP-DATA.request, 500) to transmit data packets from the user as well as data packets PDCP-SDU (Service Data Unit) together with the request. Being network layer data packets, these packets are also called N-SDUs. The PDCP entity compresses the header fields of the data packets and sends the resulting data packets to the PDCP-PDU RLC layer (RLC-AM-DATA.request, 502) together with the identity data of the radio link. The RLC layer is responsible for transmitting (send, 504) data packets PDCP-PDU and for acknowledging successful transmission (send ack, 506). In the PDCP entity the data packets N-SDU are inserted into a buffer, from which they are not removed until an acknowledgement (RLC-AM-DATA.conf, 508) of successful transmission of data packets to the receiver is received from the RLC layer. The receiving PDCP receives the PDCP-PDUs transmitted from the RLC layer (RLC-AM-DATA.indication, 510), in which case the PDCP entity decompresses the data packets PDCP-PDU. Thus the original data packets N-SDU can be restored and will be forwarded to the user (PDCP-DATA.indication, 512).

Figure 6:
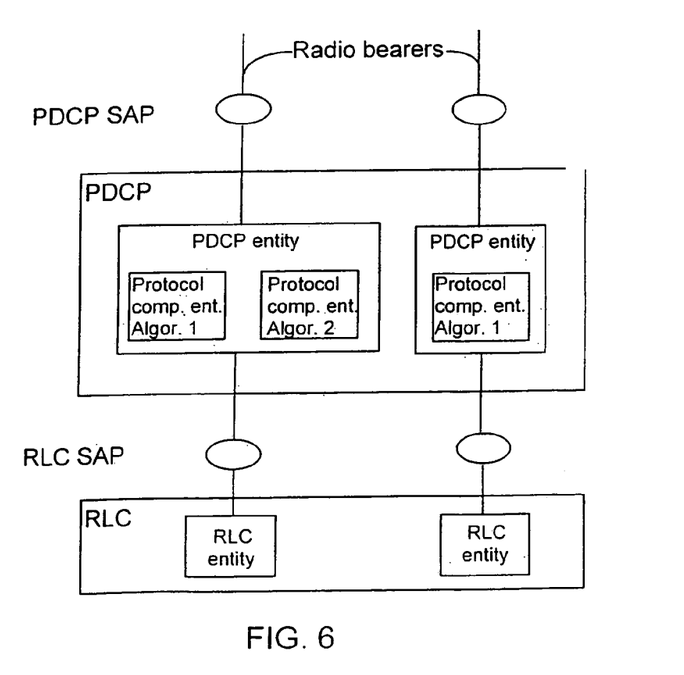
FIG. 6 is a block diagram illustrating a functional model of the PDCP layer.

FIG. 6 shows a functional model of the PDCP layer in which one PDCP entity is defined for each radio bearer. Since in the existing systems a separate PDP context is defined for each radio bearer, one PDCP entity is also defined for each PDP context, and thus a certain RLC entity is defined for the entity in the RLC layer. In the GPRS system N-PDU numbering is performed on the basis of the PDP context, for which reason the same principle has also been suggested for the UMTS system. In that case the PDCP layer would perform corresponding numbering of data packets on the basis of the PDCP entity. If similar numbering is used both in the GPRS and in the UMTS, there should be no problems in the handover between the systems. However, this requires addition of one byte to each PDCP data packet, which uses the transmission capacity of the UMTS system, particularly because this additional byte is needed only in handover between the UMTS and the GPRS and in internal handover between the radio network subsystems of the UMTS.

In principle, the functions of the PDCP layer can also be implemented by multiplexing several PDP contexts in the PDCP layer, in which case one RLC entity in the RLC layer below the PDCP layer receives data packets simultaneously from several radio bearers. In that case the data packet numbers defined on the basis of the PDCP entity are mixed in the RLC layer and it is difficult to separate data packets arriving from several radio bearers from one another, particularly if the data packet numbering is based on RLC sequence numbering.

Lossless handover, in which data packets are not lost in the handover process, is needed in reliable data transmission which utilizes acknowledged transmission. This sets certain requirements for the RLC layer of the UMTS system: the RLC layer has to be in the acknowledgement mode and the RLC must be able to send the data packets in the right order. If these conditions are met, reliable handover can be performed from the GPRS to the UMTS according to a preferred embodiment of the invention without having to transmit any data packet number.

According to the invention, a PDCP-PDU sequence number is defined for the first data packet of the packet data connection and a predetermined numerical value, e.g. 0, is set as the initial value for this number in the counter both in the transmitting PDCP and in the receiving PDCP/SNDCP. The invention can be advantageously applied both in reliable handover between the UMTS and the GPRS and in internal handover (SRNS Relocation) between radio network subsystems in the UMTS. In the former case, the term receiving PDCP used in this description can be replaced with the corresponding function of the GPRS, i.e. SNDCP.

Figure 7:
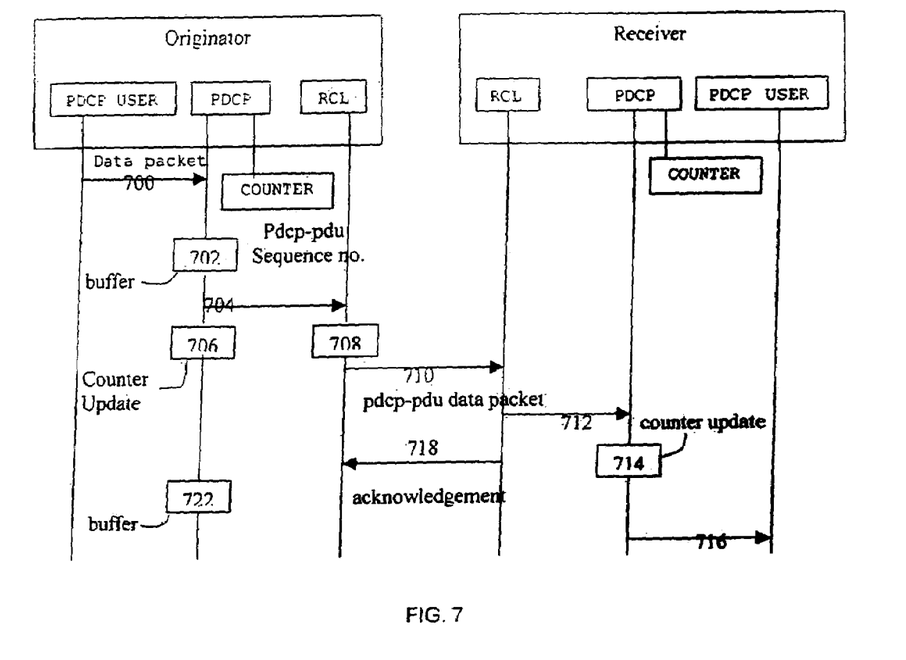
FIG. 7 is a signalling chart illustrating acknowledged data transmission which utilizes data packet numbering according to the invention, and acknowledgement of data packets in PDCP data transmission.

The method according to the invention will be illustrated with FIG. 7. When the transmitting PDCP receives (700) a data packet PDCP-SDU from the transmitter, it inserts the data packet PDCP-PDU into the buffer and logically adds a PDCP-PDU sequence number (702) to this data packet. The transmitting PDCP transmits the data packet PDCP-PDU and the PDCP-PDU sequence number logically attached to it to the RLC layer (704) and adds one (706) to the counter that determines the value of the PDCP-PDU sequence number. The RLC layer may also optionally define the ratio between the PDCP-PDU sequence number and the last RLC sequence number of the data packet and store it in memory (708). The RLC layer is responsible for transmission of PDCP-PDU data packets between the transmitter and the receiver (710), the data packets PDCP-PDU being split into data units RLC-PDU for transmission and numbered with RLC sequence numbers. When the receiving PDCP receives (712) a data packet PDCP-PDU from the RLC layer, it adds one (714) to the counter that defines the value of the PDCP-PDU sequence numbers and transmits the data packet PDCP-SDU to the next layer (716). An acknowledgement of a successfully received data packet is sent to the transmitter (718) in the RLC layer, and the transmitting RLC transmits this acknowledgement to the transmitting PDCP (720). In response to the acknowledgement, the transmitting PDCP removes the data packet PDCP-SDU in question from the buffer (722). The correct data packet PDCP-SDU to be removed is determined preferably by means of a PDCP-PDU sequence number logically attached to the data packet.

Thus data packet numbering according to the invention is preferably performed virtually, which means that no separate data packet numbers are added to the data packets, but the transmitted data packets are updated on the basis of the counters and the receiving PDCP and the transmitting PDCP can ascertain successful transmission of data packets on the basis of counter values. Consequently, in an optimal case acknowledgement of data packets according to the invention can also be made to correspond to the acknowledgement of data packets in normal PDCP data transmission described above. The actual handover process can be performed according to the prior art, e.g. as described above in connection with FIG. 4. It should be noted that even though the invention has been described in connection with a handover process, the 'virtual' data packet numbering according to the invention can also be used in normal acknowledged data transmission in which the receiver and the transmitter remain the same, whereas in the handover process one party changes.

In some interference situations, e.g. when the network is congested or there is disturbance on the radio path, the RLC layer cannot guarantee acknowledged data transmission. A maximum value is typically defined for the transmitting RLC, which is either a number of retransmissions or a period during which the transmitting RLC tries to retransmit the same data packet. If the maximum value is exceeded, the RLC layer informs the receiving PDCP of this. The transmitting PDCP removes the corresponding data packet from the buffer in connection with the next successful data packet transmission. This also happens when several successive data packets have lost. The lost data packets are removed from the buffer when an acknowledgement of the next successfully transmitted data packet is received. If the RLC can inform the PDCP layer of all lost data packets, the receiving PDCP can update the PDCP-PDU sequence number correctly, and thus the sequence number counters of the transmitting PDCP and the receiving PDCP remain synchronized. However, in some interference situations the RLC layer cannot guarantee that the PDCP layer is informed of lost data packets, in which case the PDCP-PDU sequence number counters may become asynchronous in the transmitting PDCP and receiving PDCP.

According to a preferred embodiment of the invention, this asynchronization can be corrected by sending a PDCP-PDU sequence number with the data packets PDCP-PDU at certain intervals. When the receiving PDCP receives a transmitted data packet PDCP-PDU and a PDCP-PDU sequence number-attached to it, it compares the PDCP-PDU sequence number with the counter value, and if necessary, updates the counter value to correspond to the PPDCP-PDU sequence number of the received data packet. Attachment of the PDCP-PDU sequence number to the data packet PDCP-PDU can be preferably defined in the settings of the system, in which case the PDCP-PDU sequence number can be attached to every tenth or to every hundredth data packet PDCP-PDU, for example. It is also possible to define that the PDCP-PDU sequence number is always attached to the data packet PDCP-PDU in connection with a certain process, e.g. after discard of the data packet in the RLC layer described above or after a handover process. Thus the PDCP-PDU sequence number does not need to be attached to each data packet even in poor transmission conditions but re-synchronization of the system can be preferably guaranteed by sending the PDCP-PDU sequence number only in some, preferably in very few, data packets. Naturally, data transmission is not reliable in the situation described above because data packets may disappear, but transmission of data packets can be continued because the transmitter and the receiver are synchronized rapidly.

Figure 8:
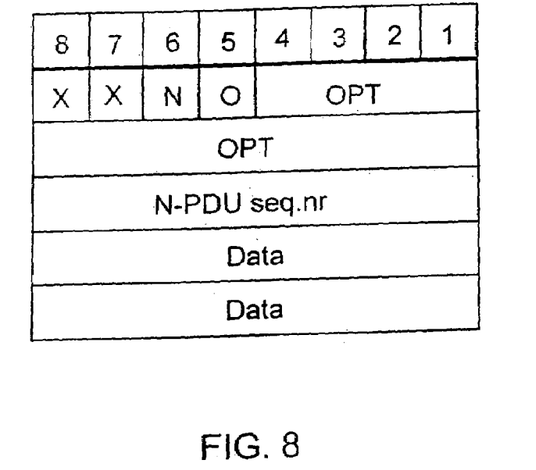
FIG. 8 illustrates the structure of a data packet utilized in the invention.

FIG. 8 illustrates a structure of the PDCP-layer data packet PDCP-PDU according to the invention. The data packet PDCP-PDU according to the invention can be used both when the PDCP-PDU sequence number is omitted from the data packet and when it is added at certain intervals defined by the system. The first byte of the data packet PDCP-PDU comprises one bit (N) whose value indicates whether a PDCP-PDU sequence number will be attached to the data packet PDCP-PDU or not. Bit O indicates whether an optimisation algorithm is used for forming a data packet PDCP-PDU. If bit O receives value 1, optimisation is used and it is defined more accurately with a 12-bit optimisation field (OPT), which contains four bits from the first byte of the data packet PDCP-PDU and all bits of the second byte. Values of the optimisation field are used for determining the compression method of the header field and the data packet type, for example. On the basis of the optimisation field values the receiving PDCP can perform opposite procedures on the data packet, such as decompression of the header field. There are no predetermined values for the optimisation field, but the transmitter and the receiver always agree on them separately in the negotiation of PDCP parameters. A PDCP-PDU sequence number field containing one byte, i.e. 8 bits, is optional and is used if bit N receives value 1. In that case the PDCP-PDU sequence number is added to the data packet PDCP-PDU. The actual user data to be transmitted in the data packet are attached after these definitions.

The data packet structure described above is only an example of how a PDCP-PDU data packet according to the invention can be formed. Alternatively, the information included in the data packets PDCP-SDU arriving from the upper application-level layers can be forwarded from the PDCP layer using three different data packets PDCP-PDU: PDCP-No-Header-PDU, PDCP-Data-PDU and PDCP-SeqNum-PDU, which are illustrated in FIGS. 9a, 9b and 9c, respectively.

Figure 9A:
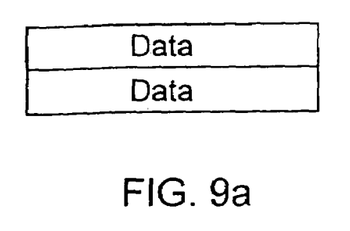
FIGS. 9a, 9b and 9c illustrate the structure of different data packets utilized in the invention.

According to FIG. 9a, the PDCP-No-Header-PDU comprises only data, i.e. the PDCP-SDU received from the upper layers as such. Thus the PDCP layer does not add any information to the PDCP-SDU, in which case the whole PDCP-PDU is used for transmitting payload. Consequently, the PDCP-No-Header-PDU can be preferably used in acknowledged data transmission described above in which data packet numbering is maintained by means of counters.

Figure 9B:
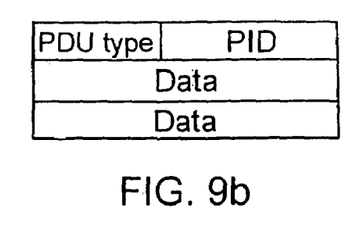

One byte (8 bits) has been added to the PDCP-Data-PDU of FIG. 9b to indicate the PDU type in question and the compression method to be applied to the header field of the PDCP-SDU. In fact, the tasks of the PDCP layer include functions related to improvement of channel capacity, which are typically based on optimisation of data packet header fields by means of various compression algorithms.

Figure 9C:
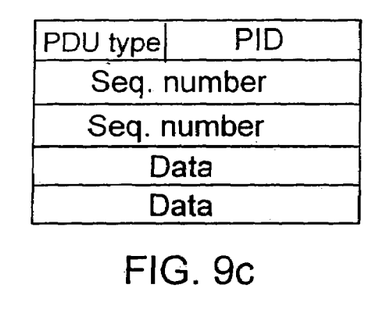

The PDCP-SeqNum-PDU of FIG. 9c also comprises a corresponding extra byte for indicating the PDU type and the compression method to be applied to the PDCP-SDU header field. In addition to this, a PDCP-PDU sequence number with a length of two bytes, i.e. 16 bits, has been added to it. Both in the PDCP-Data-PDU and in the PDCP-SeqNum-PDU the PDU type is indicated with three bits, and thus it separates the PDCP-Data-PDU from the PDCP-SeqNum-PDU. The compression method to be used is indicated with five bits.

One of the functions of the PDCP layer is to transmit data packets PDCP-PDU and, if necessary, PDCP sequence numbers related to the packets to a new radio network subsystem in internal handover (SRNS Relocation) between radio network subsystems in the UMTS. During the handover the interference situations described above may render the data packet counters asynchronous and cause a situation in which the transmitting PDCP has sent a data packet (e.g. PDCP-No-Header-PDU) but it has not been transferred to the new receiving PDCP. When the maximum value of retransmissions has been exceeded, the discard function of data packets is terminated in the RLC layer. The transmitting RLC informs the transmitting PDCP of this, and the transmitting PDCP removes the data packet in question from the buffer. As a result of this, the receiving PDCP waits for a data packet which is no longer in the buffer of the transmitting PDCP, and thus data packet counters cannot be synchronized. Such an error situation may result in clearing of the radio bearer.

According to a preferred embodiment, the transmitting PDCP is made to send a data packet number with the first data packet in the buffer, i.e. a PDCP-SeqNum-PDU data packet is used. Consequently, the receiving PDCP synchronizes its data packet counter with the transmitting PDCP utilizing the data packet number sent, which is the quickest possible way to achieve synchronization. Furthermore, data transmission can be continued as soon as the counters have been synchronized, and it is unnecessary to clear the radio bearer, which might result in greater loss of information. After synchronization, data transmission can be continued using the data packet format defined for the radio bearer, e.g. PDCP-No-Header-PDCP data packets.

It is obvious to a person skilled in the art that as the technology advances, the inventive concept can be implemented in various ways. The invention and its embodiments are thus not limited to the examples described above but may vary within the scope of the claims.

What is claimed is:

1. A method for transmission of data packets in a packet-switched telecommunications system, the telecommunications protocol of which comprises a convergence protocol layer for converting user data packets into convergence protocol packets, and a link layer for transmitting convergence protocol packets as data units and for acknowledging the transmission, the method comprising the steps of:

defining a transmit data packet number, for the convergence protocol packets to be sent, by a counter in a transmitter;

transferring the convergence protocol packets to be sent to the link layer for transmission;

defining a receive data packet number, for received convergence protocol packets, by a counter in a receiver;

acknowledging the received convergence protocol packets;

adding the transmit data packet number defined by the transmitter's counter to the convergence protocol packet to be sent in response to performance of a predetermined process of the telecommunications system; and updating the value of the receiver's counter to correspond to said transmit data packet number.

2. A method according to claim 1, further comprising the steps of:

performing said adding of the transmit data packet number to a convergence protocol packet to be sent in the link layer at predetermined intervals in response to the link layer being unable to guarantee acknowledged transmission of the convergence protocol packets;

comparing the value of the receiver's counter with the transmit data packet number of the received convergence protocol packet; and updating the value of the receiver's counter to correspond to said transmit data packet number in response to the values being unequal.

3. A method according to claim 1, wherein said predetermined process of the telecommunications system is discard of a data packet or handover.

4. A method according to claim 1, further comprising:

removing unacknowledged user data packets from a buffer in response to the fact that the receiver sends an acknowledgement to the transmitter of reception of a convergence protocol packet corresponding to the user data packet sent after the unacknowledged user data packets.

5. A method according to claim 1, further comprising the step of performing said adding of the transmit data packet number defined by the transmitter's counter to the convergence protocol packet that is first in the transmitter's buffer in response to the fact that at least one unacknowledged user data packet has been removed from the transmitter's buffer, after the maximum value of retransmissions defined in the link layer has been exceeded.

6. A method according to claim 1, wherein said telecommunications system is a packet-switched mobile communication system, such as the UMTS or the GPRS system, which utilizes acknowledged transmission.

7. A method according to claim 6, wherein the method is applied in handover between the UMTS and the GPRS.

8. A method according to claim 6, wherein the method is applied in handover between radio network subsystems in the UMTS.

9. A packet-switched telecommunications system which comprises a terminal and a fixed network, which comprises a network element supporting packet-switched data transmission, data packets being arranged to be sent between the terminal and the network element in the telecommunications system and the telecommunications protocol of the telecommunications system comprising a convergence protocol layer for converting user data packets into convergence protocol packets, and a link layer for transmitting convergence protocol packets as data units and for acknowledging the transmission, whereby in the transmission of data packets between the terminal and the network element the system is arranged to:

define, by means of a counter in a transmitter, a transmit data packet number for the convergence protocol packets to be sent, transfer the convergence protocol packets to be sent to the link layer for transmission, define, by means of a counter in a receiver, a receive data packet number for received convergence protocol packets, acknowledge the received convergence protocol packets, add the transmit data packet number defined by the transmitter's counter to the convergence protocol packet to be sent in response to performance of a predetermined process of the telecommunications system, and update the value of the receiver's counter to correspond to said transmit data packet number of the convergence protocol packet.

10. A telecommunications system according to claim 9, wherein the system is further arranged to:
add the transmit data packet number, defined by the transmitter's counter, to the convergence protocol packet to be sent at predetermined intervals, in response to the link layer being unable to guarantee acknowledged transmission of convergence protocol packets, compare the value of the receiver's counter with the transmit data packet number of the received convergence protocol packet, and update the value of the receiver's counter to correspond to said transmit data packet number in response to the values being unequal.

11. A telecommunications system according to claim 9, wherein said predetermined process of the telecommunications system is discard of a data packet or handover.

12. A telecommunications system according to claim 9, wherein the system is further arranged to remove unacknowledged user data packets from a buffer in response to the fact that an acknowledgement is sent from the receiver to the transmitter of reception of a convergence protocol packet corresponding to the user data packet sent after the unacknowledged user data packets.

13. A telecommunications system according to claim 9, wherein said telecommunications system is a packet-switched mobile communication system, such as the UMTS or the GPRS system, which utilizes acknowledged transmission.

14. A telecommunications system according to claim 13, wherein the system is further arranged to define, by means of the transmitter's counter, a transmit data packet number defined in one system in handover between a UMTS and a GPRS.

15. A telecommunications system according to claim 13, wherein the system is further arranged to define, by means of the transmitter's counter, a transmit data packet number in handover between radio network subsystems in the UMTS.

16. A network element for a packet-switched telecommunication system, said network element being arranged to transmit data packets to a terminal supporting a packet-switched data transmission, said network element comprising:
a counter for defining a transmit data packet number for the convergence protocol packets to be transmitted between the network element and the terminal;

means for transferring the convergence protocol packets to be transmitted to the link layer to be transmitted;

means for receiving acknowledgements of the received convergence protocol packets from said terminal; and means, responsive to performance of a predetermined process of the telecommunications system, for adding the transmit data packet number, defined by the counter, to the convergence protocol packet, to be sent to the terminal.

17. A network element as claimed in claim 16, wherein said means for adding the transmit data packet number are arranged to add the transmit data packet number, defined by the counter, to the convergence protocol packet to be sent at predetermined intervals in response to the link layer being unable to guarantee acknowledged transmission of convergence protocol packets.

18. A network element as claimed in claim 16, wherein said predetermined process of the telecommunications system is discard of a data packet or handover.

19. A network element as claimed in claim 16, further comprising means for removing unacknowledged user data packets from a buffer in response to the fact that an acknowledgement is sent from the receiver to the transmitter of reception of a convergence protocol packet corresponding to the user data packet sent after the unacknowledged user data packets.

20. A network element as claimed in claim 16, wherein the telecommunications system of said network element is a packet-switched mobile communication system, such as the UMTS or the GPRS system, which utilizes acknowledged transmission.

21. A network element as claimed in claim 20, wherein the network element is further arranged to define, by means of the counter, the transmit data packet number in handover between the UMTS and the GPRS.

22. A network element as claimed in claim 20, wherein the network element is further arranged to define, by means of the counter, the transmit data packet number in handover between radio network subsystems in the UMTS.

23. A terminal for a packet-switched telecommunication system, said terminal being arranged to transmit data packets to a network element supporting a packet-switched data transmission, said terminal comprising:
a counter for defining a transmit data packet number for the convergence protocol packets to be transmitted between the terminal and the network element;

means for transferring the convergence protocol packets to be transmitted to the link layer to be transmitted;

means for receiving acknowledgements of the received convergence protocol packets form said network element; and means, responsive to performance of a predetermined process of the telecommunications system, for adding the transmit data packet number defined by the counter, to the convergence protocol packet to be sent to the network element.

24. A terminal as claimed in claim 23, wherein said means for adding the transmit data packet number are arranged to add the transmit data packet number, defined by the counter, to a convergence protocol packet to be sent at predetermined intervals in response to the link layer being unable to guarantee acknowledged transmission of convergence protocol packets.

25. A terminal as claimed in claim 23, wherein said predetermined process of the telecommunications system is discard of a data packet or handover.

26. A terminal as claimed in claim 23, further comprising means for removing unacknowledged user data packets from a buffer in response to the fact that an acknowledgement is sent from the receiver to the transmitter of reception of a convergence protocol packet corresponding to the user data packet sent after the unacknowledged user data packets.

27. A terminal as claimed in claim 23, wherein the terminal supports a packet-switched mobile communication system, such as the UMTS or the GPRS system, which utilizes acknowledged transmission.

28. A terminal as claimed in claim 27, wherein the terminal is further arranged to define, by means of the counter, the transmit data packet number in handover between the UMTS and the GPRS.

29. A terminal as claimed in claim 27, wherein the terminal is further arranged to define, by means of the counter, the transmit data packet number in handover between radio network subsystems in the UMTS.

30. A network element as claimed in claim 16, wherein said network element is arranged to send the convergence protocol packet and its transmit data packet number to the terminal for updating the value of the terminal's counter to correspond to said transmit data packet number.

31. A terminal as claimed in claim 24, wherein said terminal is arranged to send the convergence protocol packet and its transmit data packet number to the network element for updating the value of a network element's counter to correspond to said transmit data packet number.

* * * * *

UNITED STATES PATENT AND TRADEMARK OFFICE
CERTIFICATE OF CORRECTION

PATENT NO.         : 7,009,951 B2                                          Page 1 of 1
APPLICATION NO.    : 09/779979
DATED              : March 7, 2006
INVENTOR(S)        : Kalliokulju et al.

It is certified that error appears in the above-identified patent and that said Letters Patent is hereby corrected as shown below:

Title page #75
Please add the fifth inventor, Hans Kallio.

Signed and Sealed this

Twentieth Day of March, 2007

JON W. DUDAS
*Director of the United States Patent and Trademark Office*